(No Model.) 2 Sheets—Sheet 1.

R. F. PREUSSER.
SAFETY GUARD FOR STREET CARS.

No. 578,522. Patented Mar. 9, 1897.

Witnesses
G. M. Lamasure
G. H. Walmsley

Inventor
R. F. Preusser
By Alexander & Davis
Attorneys (No Model.) 2 Sheets—Sheet 2.
R. F. PREUSSER.
SAFETY GUARD FOR STREET CARS.
No. 578,522. Patented Mar. 9, 1897.
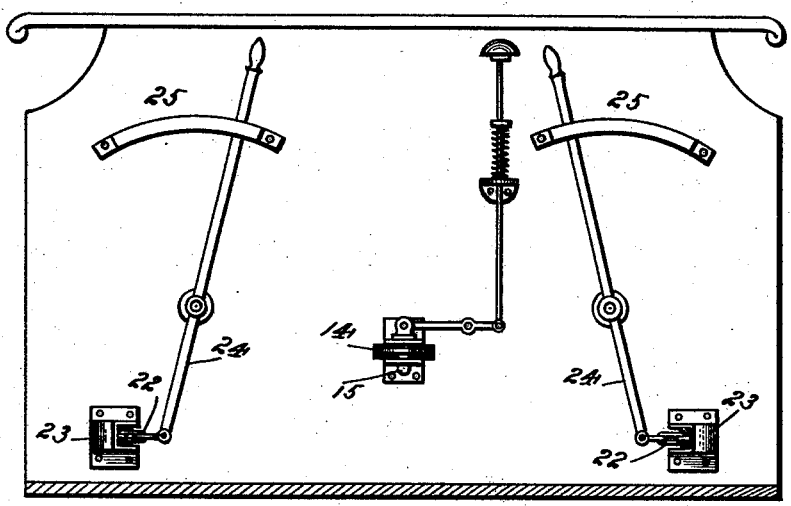
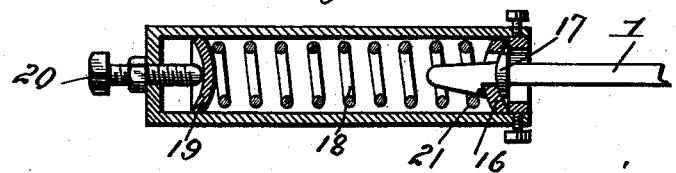
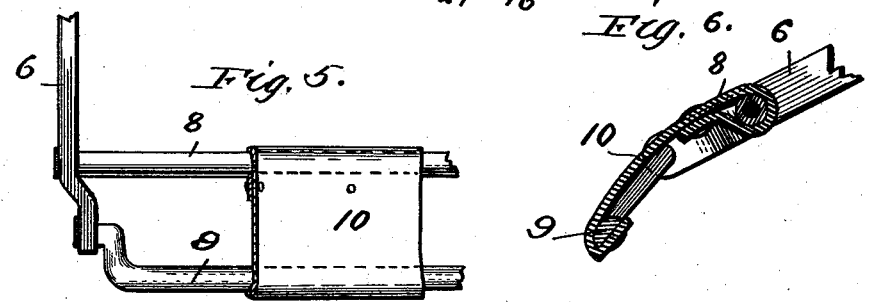
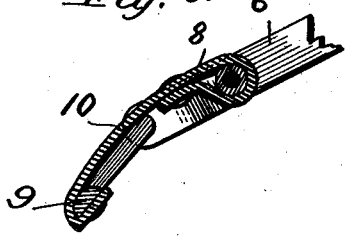
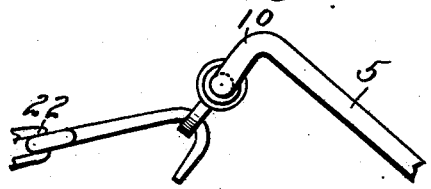
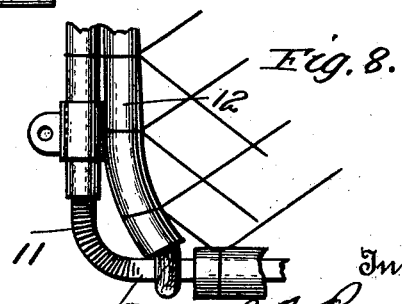

UNITED STATES PATENT OFFICE.

RICHARD F. PREUSSER, OF WASHINGTON, DISTRICT OF COLUMBIA.

SAFETY-GUARD FOR STREET-CARS.

SPECIFICATION forming part of Letters Patent No. 578,522, dated March 9, 1897.

Application filed June 18, 1896. Serial No. 596,021. (No model.)

*To all whom it may concern:*

Be it known that I, RICHARD F. PREUSSER, a citizen of the United States, residing at Washington, in the District of Columbia, have invented certain new and useful Improvements in Safety-Guards for Street-Cars, of which the following is a specification, reference being had therein to the accompanying drawings.

This invention has relation to certain improvements upon the safety-guard covered by my former patent, dated June 16, 1896, No. 562,320; and it consists of certain novel features of construction hereinafter particularly described, and pointed out in the claims appended.

Figure 1:
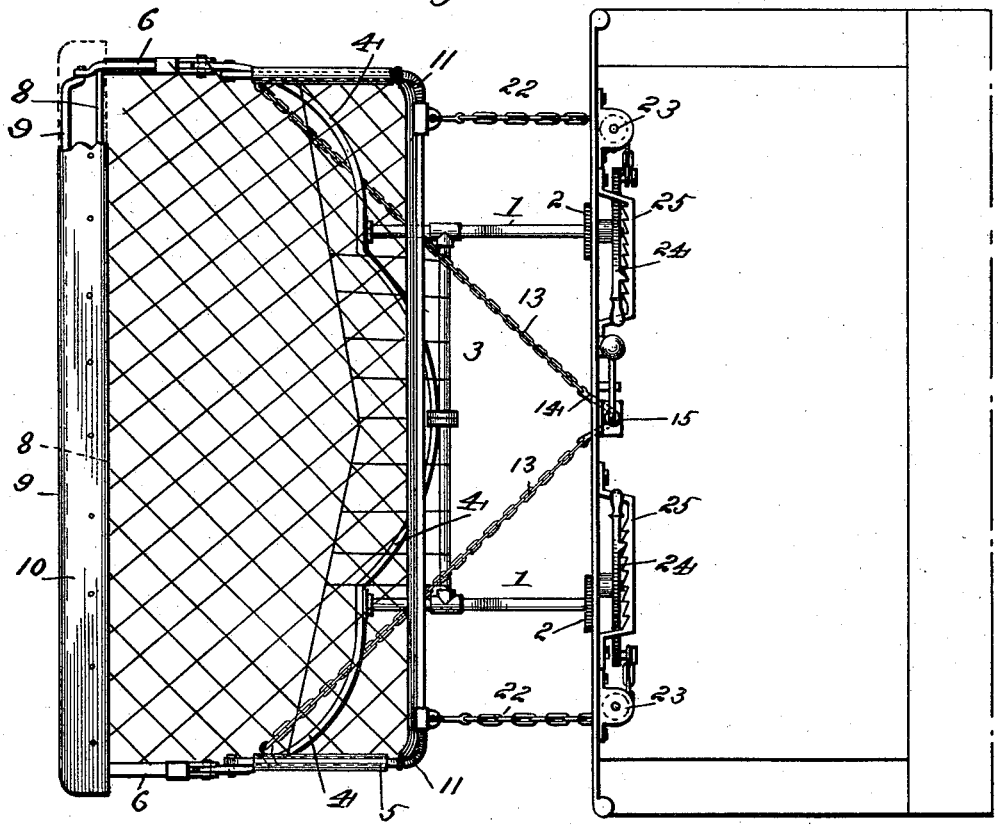
Figure 2:
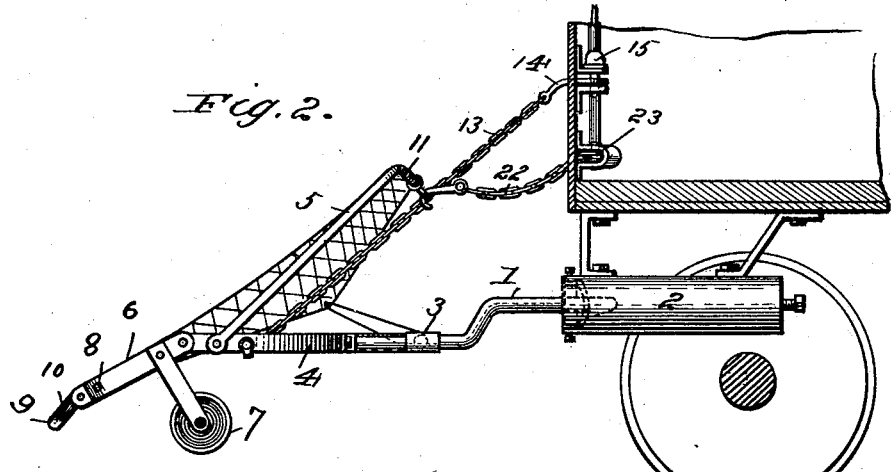

Referring to the drawings, Figure 1 is a plan view of my improved devices attached to a car; Fig. 2, a vertical section thereof; Fig. 3, an inside view of the dashboard, showing particularly the devices for dropping the guard and for shifting it in turning curves; Fig. 4, a vertical longitudinal section of one of the spring-containing cylinders; Figs. 5 and 6, detail views of the buffer, and Figs. 7 and 8 detail views showing the formation of the end of the net-frame.

Referring to the drawings by numerals, 1 designates the two rearwardly-extending rods, working in the cylinders 2, secured under the car-body, these cylinders being closed at their rear ends and open at their front ends. The rods 1 are connected together by the cross-rod 3, and attached to the frame thus formed is the frame 4, which supports the net-frame 5 and carries at its forward end the downwardly-swinging buffer-frame 6. The buffer-frame 6 is pivoted to the forward ends of the bar 4 and is supported, when the apparatus is lowered, by the roller 7, which preferably works upon the service-rails. Across the front end of the frame 6 extends the buffer, which consists of a transverse rigid bar 8, connecting the end bars of the frame, and another elastic bar 9, connecting the frame-bars and extending across in front of the bar 8 and in a plane somewhat lower than the same. This elastic bar 9 is usually secured rigidly to the frame-bar 6, but it may be pivoted thereto at its ends, if desired. Connecting the bars 8 and 9 and extending entirely across the apparatus is a strip of elastic material 10, the front edge of this material being turned down over the upper rounded surface of rod 9 and riveted to the under side thereof, and its upper rear edge being folded down around rod 8, so as to inclose the same, and riveted to the main fabric. The buffer thus constructed is simple and durable and presents a smooth rounded resilient surface to the object struck. When the elastic bar 9 is struck by an object, it yields downward toward the road-bed, and not only cushions the blow, but also prevents the object from working under the guard. The elastic fabric not only serves as a cushion, but also assists in restoring the elastic rod to its normal position.

The net-frame, as usual, extends upwardly and rearwardly and carries the usual netting, which extends from the net-frame to the swinging buffer-frame. The upper cross-bar of the net-frame does not extend directly across, as in my former construction, but is dropped down a few inches below the side bars of the frame, the side bars being bent downward at 11 for this purpose; and extending across the top of the net-frame above the said upper bar is a yielding rope 12, which is connected at its ends to the side bars at the bends 11 and is preferably covered with a suitable buffer material. This construction of the net-frame secures the desired height and at the same time gets rid of the rigid upper cross-bar, or, rather, enables it to be located out of the way, so that a picked-up body will not strike against it. The yielding rope 12 takes all the blows that would otherwise be taken by the rigid bar, and thereby avoids serious injury.

The frame of the guard is held up from the track by means of the chains 13, which are connected to a loop 14, which extends through an opening in the dashboard and is engaged by a vertical pin 15, this pin being raised and lowered by suitable mechanism on the dashboard.

The rear end of each of the rods 1 extends through the central opening in the sliding support 16, working in the cylinder, the usual projection 17 on the rod bearing against said support. The support is kept pressed normally forward by the coil-spring 18, and the tension on this spring is regulated by a sliding plate 19 in the rear of the cylinder, this plate being adjustable by means of a suitable screw 20. The rod 1 within the cylinder and immediately behind the sliding support 16 is provided with a hook-like projection 21, which engages the sliding support and prevents the rod being jarred out of the cylinder. The opening in the sliding support is of course large enough to permit the rod to be freely inserted and removed. The hook-like construction of the rod is desirable, as it enables the portion projecting beyond the sliding support to be made much shorter than heretofore, the construction heretofore having required a considerable portion of the rod to project within the cylinder to prevent the rod being jarred out of the same, and this having been objectionable because the end of the rod would sometimes engage the coil-spring.

Attached to the net-frame at each upper corner is a chain 22, which passes back through an opening in the dashboard, over a roller 23, and inward to the lower end of a lever 24, this lever being pivoted to the dashboard and normally engaging ratchet-teeth on a segment 25, secured to the dashboard. By means of this pair of levers and chains the operator may readily swing the guard-frame toward either side sufficiently to enable it to follow the curvature of the rails, as is evident, and the ratchet-segments normally hold the levers in their adjusted positions, and when the levers are released the springs in the cylinders throw the frame out to its normal position.

Having thus fully described my invention, what I claim, and desire to secure by Letters Patent, is—

1. The combination with the net-frame and supporting-frame, of the swinging buffer-frame having a buffer extending across its front end, the said buffer consisting of a front elastic rod and a rear rod, both rods extending transversely of the frame, and an elastic fabric connecting said rods, substantially as described.

2. The combination of the net-frame and supporting-frame, said net-frame extending upwardly and rearwardly and having its upper bar dropped down below its upper edge, and a yielding rope or other connection extending across the net-frame above said bar, substantially as described.

3. The combination of the cylinders containing the spring-actuated supports, and the movable frame carrying the net-frame and the rearwardly-extending rods, each of the rods working through an opening in one of the sliding supports and provided with a hook-like projection engaging the sliding support, as and for the purpose set forth.

4. The combination with the car, of the guard-frame, carrying the net, means for resiliently pressing said frame forward and allowing it to yield laterally in either direction, a chain detachably connected to the top of the net-frame at each side of the car and extending directly backward through the dashboard, a pulley supporting each chain where it passes through the dashboard, two independent levers pivoted on the dashboard one at either side of the car and each being connected to its adjacent chain, and means for locking the levers in their adjusted positions, substantially as described.

In testimony whereof I affix my signature in presence of two witnesses.

RICHARD F. PREUSSER.

Witnesses:
 ALEX. S. STEUART,
 G. H. WALMSLEY.